United States Patent [19]

Kovalenko et al.

[11] Patent Number: 5,016,334
[45] Date of Patent: May 21, 1991

[54] MULTIPLE SPINDLE BAR MACHINE

[75] Inventors: Thomas R. Kovalenko, Elkhart, Ind.; Lu B. Xin, Shenyang, China

[73] Assignees: Shenyang No. 3 Machine Tool Works, Shenyang, China; Key Machine Tool, Incorporated, Elkhart, Ind.

[21] Appl. No.: 387,004

[22] Filed: Jul. 31, 1989

[51] Int. Cl.⁵ .................................................. B23B 9/04
[52] U.S. Cl. ..................................... 29/38 B; 82/129
[58] Field of Search .......................... 29/38 B; 82/129

[56] References Cited

U.S. PATENT DOCUMENTS

| 4,665,781 | 5/1987 | Eichenhofer et al. | 82/129 |
| 4,700,594 | 10/1987 | Heinen | 82/129 |
| 4,771,662 | 9/1988 | Eichenhofer et al. | 82/129 |

Primary Examiner—Steven C. Bishop
Attorney, Agent, or Firm—Todd A. Dawson

[57] ABSTRACT

A multiple spindle bar machine which includes a carrier rotatively supporting a plurality of spindles. The carrier is rotatable to index the spindles to a successive work station. Separate spindle drives supported by the carrier are provided to rotate each spindle independently of each other spindle. Each spindle drive includes a motor supported by the frame and a clutch assembly for transferring rotative motion from the motor to the drive means. Each clutch assembly includes two clutch plates which are separable to allow rotation of the carrier to index the spindles.

1 Claim, 6 Drawing Sheets

MULTIPLE SPINDLE BAR MACHINE

SUMMARY OF THE INVENTION

This invention relates to turning machine devices and will have application to a multiple spindle bar turning machine.

A multi-spindle bar machine usually has a plurality of work spindles (typically four, six or eight) mounted parallel to one another in a cylindrical indexable spindle carrier. The bar stock to be machined is securely held by collet in the work spindle and is supported at the other end by a stock reel which is coupled to and indexable with the spindle carrier. The bar stocks held in the spindles together with the spindle carrier are indexed periodically through successive work stations to receive different machining operations and finally cut off as work pieces.

Heretofore, the spindles of a multi-spindle bar machine are driven by a single motor through a train of gears which rotates all work spindles at the same speed. Various cutting tools in different work stations operate at less than optimum cutting speed because of the fixed speed of all spindles. The result is a loss of machining efficiency and quality.

The multiple spindle bar turning machine of this invention eliminates the above problem by providing a separate variable speed drive motor for each spindle. A network of gears is arranged such that as the spindles are indexed to the next workstation, the spindle is drive connected to a different variable speed motor.

Each drive motor may be controlled to run at an appropriate speed for the particular turning task at that station and changed instantly or continuously even during machining, independent of the other drive motors. This allows the machine to perform at optimum speed in all stations. This results in a higher quality product and increased machine efficiency.

Accordingly it is an object of this invention to provide for an efficient bar turning machine having a plurality of indexable spindles.

Another object of this invention is to provide a multiple bar turning machine wherein each spindle is independently driven with respect to one another.

Another object of the invention is to provide a multiple spindle bar turning machine in which each spindle can be indexed and connected to a different drive motor.

Other objects of this invention will become apparent upon a reading of the following description.

DESCRIPTION OF THE PREFERRED EMBODIMENT

The preferred embodiment herein disclosed is not intended to be exhaustive or to limit the invention to the precise form disclosed. It is described and illustrated to enable others skilled in the art to utilize its teachings.

Figure 1:
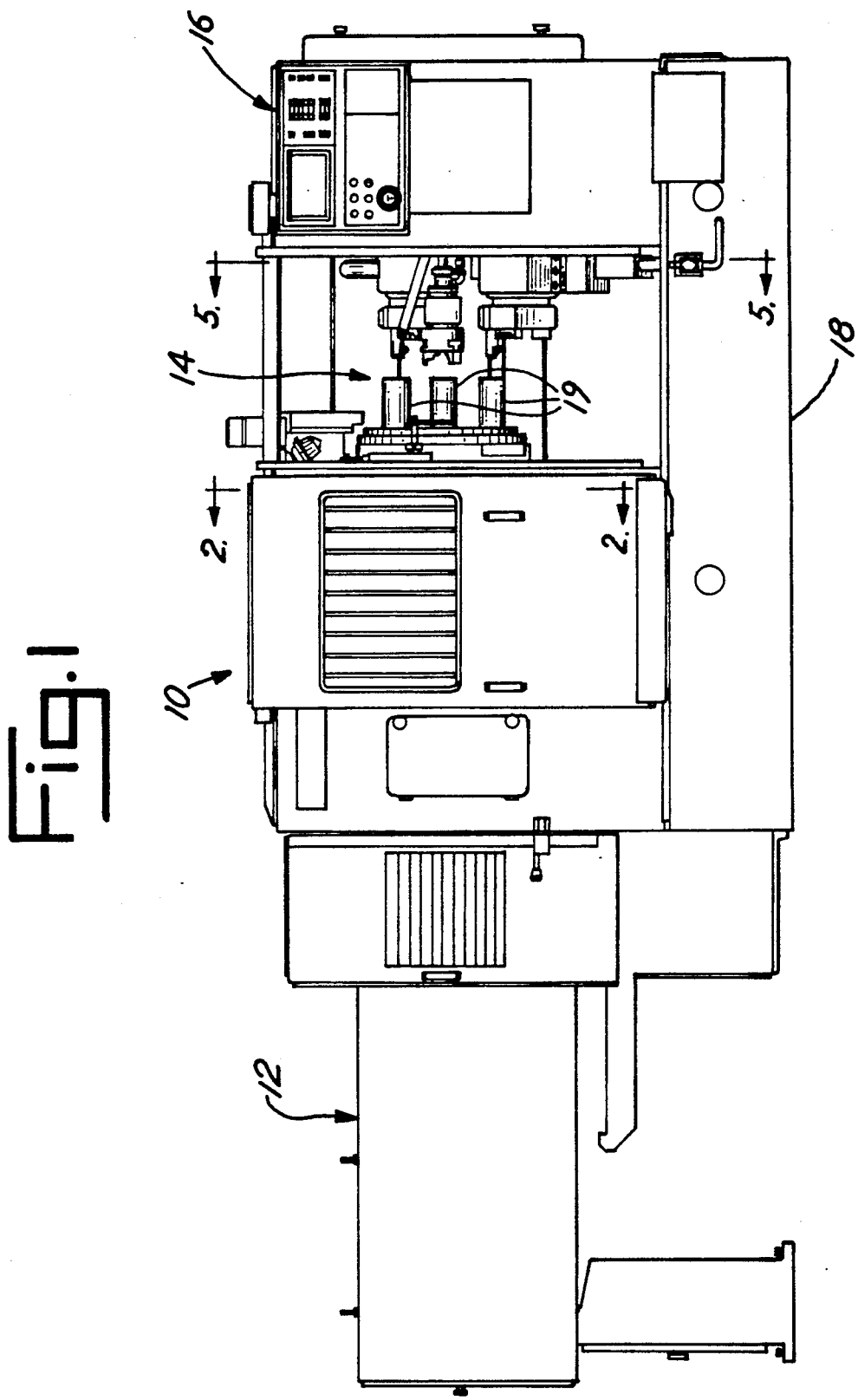
FIG. 1 is a side elevational view of the multiple bar spindle machine of this invention.
Figure 4:
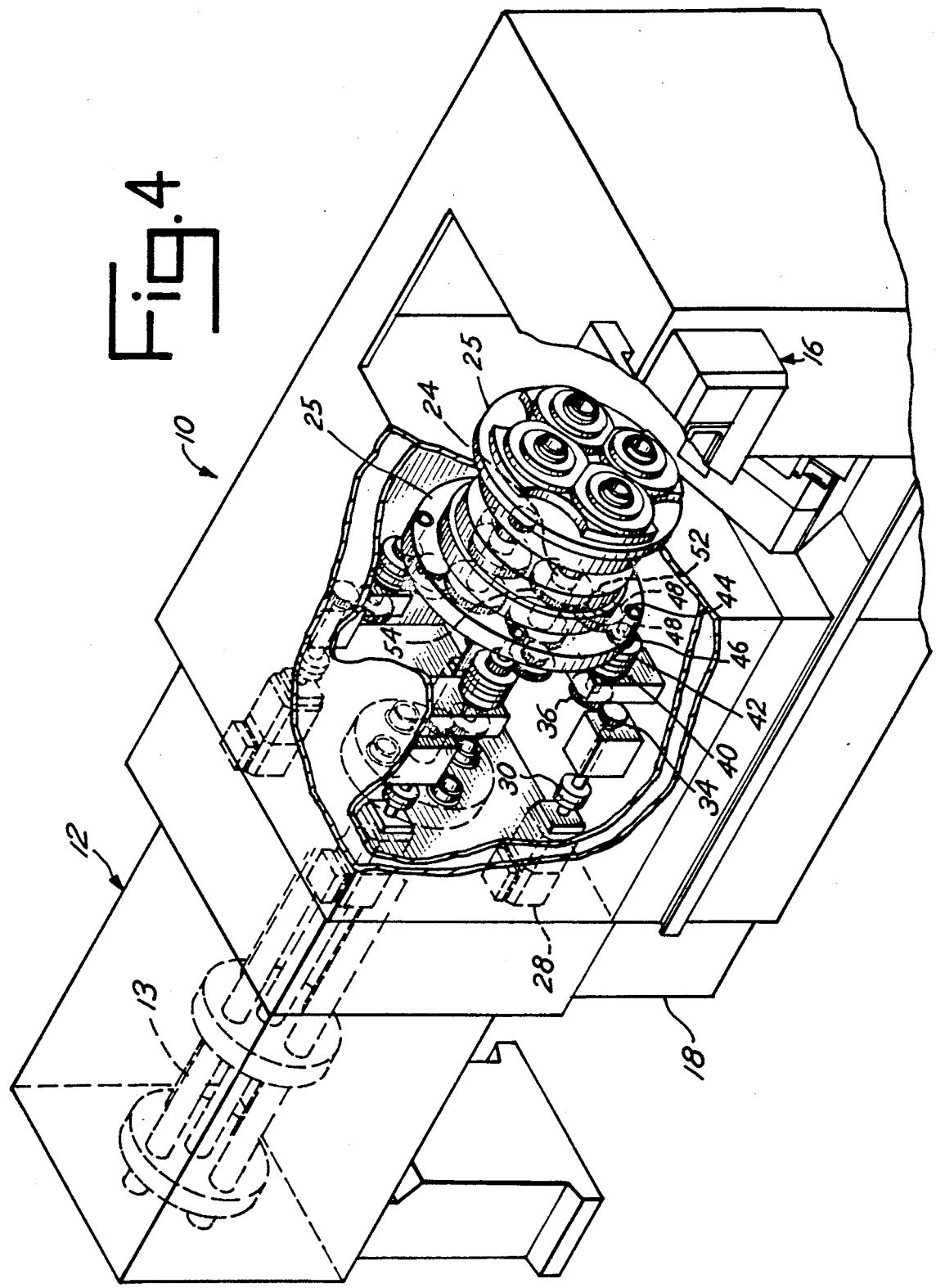
FIG. 4 is a perspective view of the machine with portions of the housing cut away for illustrative purposes.

The multiple-spindle bar machine 10 of this invention is generally illustrated in FIG. 1 and FIG. 4. The machine has a CNC control panel 16 and includes a spindle carrier 25 with a plurality of work spindles 24 (presently four). The spindle carrier is fitted in the big bore of housing 18, and is coupled with stock reel 13 which is supported by stand 12. As is common in the industry, bar stock 19 is securely held by a collet at the right end of the spindle and is supported by bearing sleeves (not shown) in stock reel 13 at the other end. The bearing sleeves rotate with the bar thus creating a silent and stable support for the bar while the machine is running.

Figure 3:
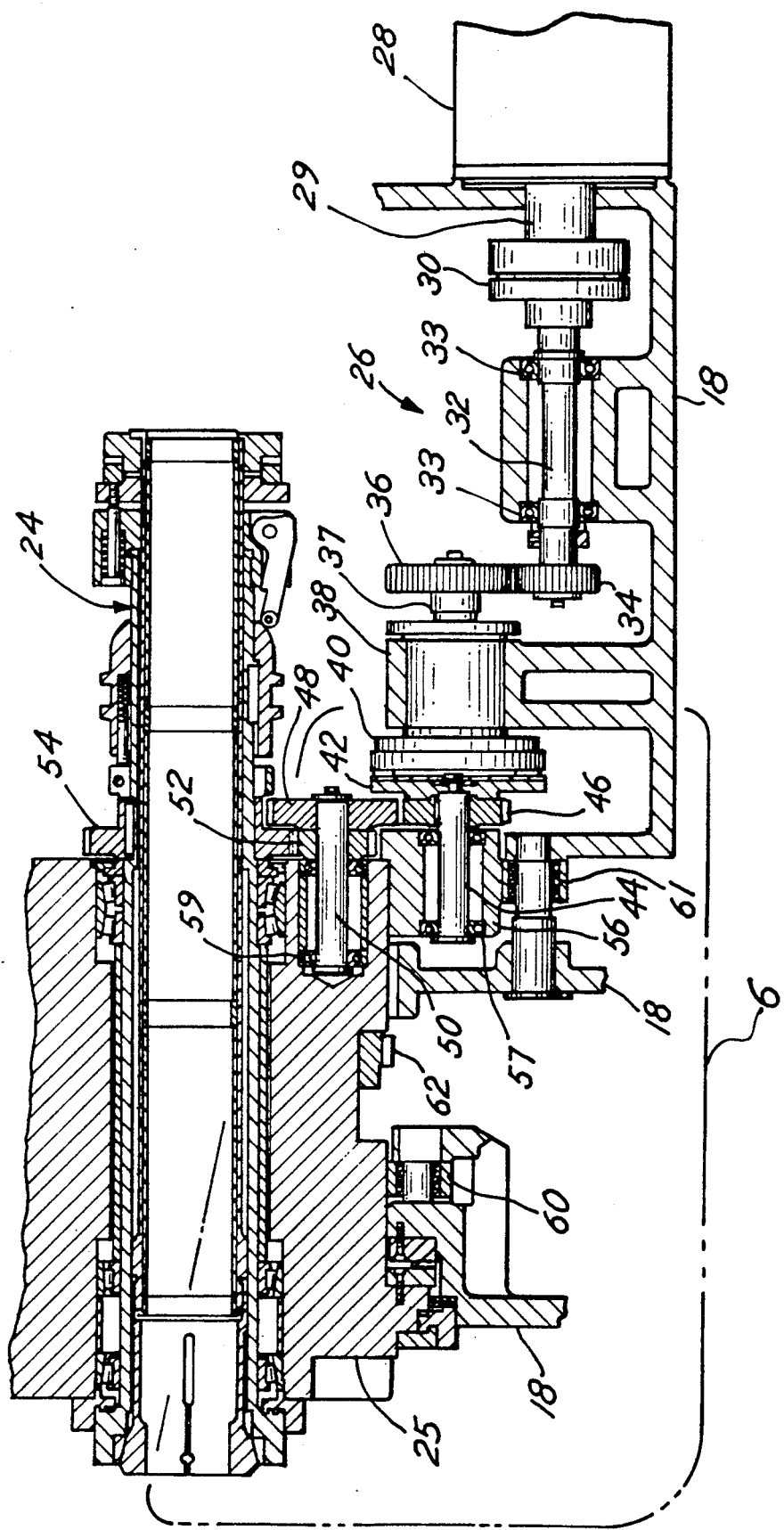
FIG. 3 is a fragmented sectional view taken along line 3—3 of FIG. 2 showing the drive for each spindle.
Figure 6:
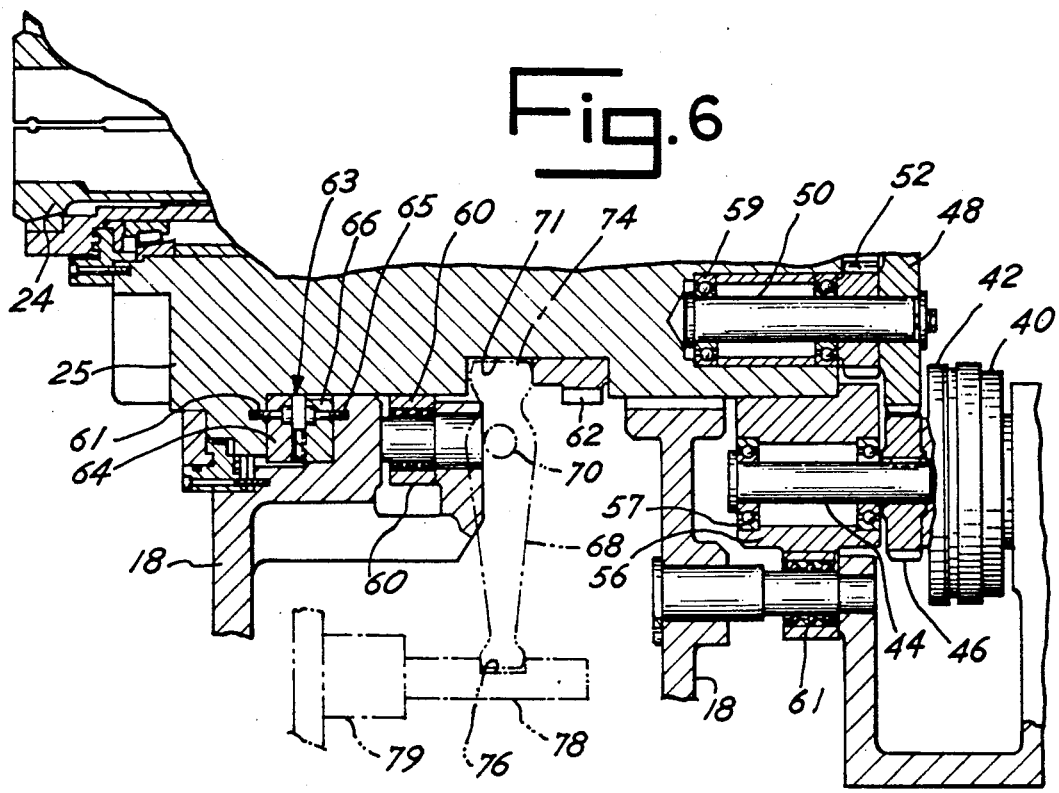
FIG. 6 is a fragmented detailed sectional view of that portion of FIG. 3 within broken line 6.

As illustrated in FIG. 4, machine 10 includes a plurality of spindles 24 rotatively supported in an aligned configuration with stock reel 13 by carrier 25. Spindles 24 serve to rotate bar stock 19 during the turning process. As best shown in FIG. 6, carrier 25 is rotatively supported by bearings 60 and 61. Ring gear 62 extends about carrier 25 and is connected to a drive (not shown) for indexing the carrier relative to housing 18 to position spindles 24 in alignment with successive work stations. A Hirth coupling 63 which has opposed gears 64, 66 is secured between carrier 25 and frame 18. Gears 64, 66 mesh when carrier 25 is in its work position as seen in FIG. 6 to secure the carrier against rotative movement during the turning operation. The construction of spindle 24 as is illustrated in FIG. 3 and as thus far described is common in the industry and as such its detailed construction will not be further described.

In this invention, each spindle 24 is rotated by a separate drive system 26. It should be understood that each drive system 26 is identical in construction differing only in its orientation with each spindle 24. Therefore, only one such drive system 26 will be described in full. As shown in FIG. 3, each drive system 26 includes its own variable speed electric motor 28 which is controlled by CNC controller 16 and has its drive shaft 29 connected through a flexible coupling 30 to a shaft 32. Shaft 32 is journalled within bearing 33 carried by housing 18 and carries a gear 34. Gear 34 meshes with gear 36 which is attached to the drive shaft 37 of clutch assembly 38. Clutch assembly 38 is common in the industry and is supported in frame 18 and includes clutch plates 40 and 42. Plate 40 is drive connected to gear 36. Plate 42 is connected by shaft 44 to gear 46. Shaft 44 is journalled in bearings 57 in carrier 25. Gear 46 meshes with gear 48 which is connected to a shaft 50. Shaft 50 is journalled within bearings 59 in carrier 25. Gear 52 is also connected to shaft 50 and meshes with ring gear 54 which is keyed to spindle 24 for correlative rotation. When energized, plates 40, 42 of this clutch assembly 38 engage to transmit rotative motion upon activation of a specific motor 28 to its gear connected spindle 24. When deenergized, plates 40, 42 separate and disrupt rotative motion from motor 28 to spindle 24. The operation of clutch assembly 38 is common in the industry.

Figure 2:
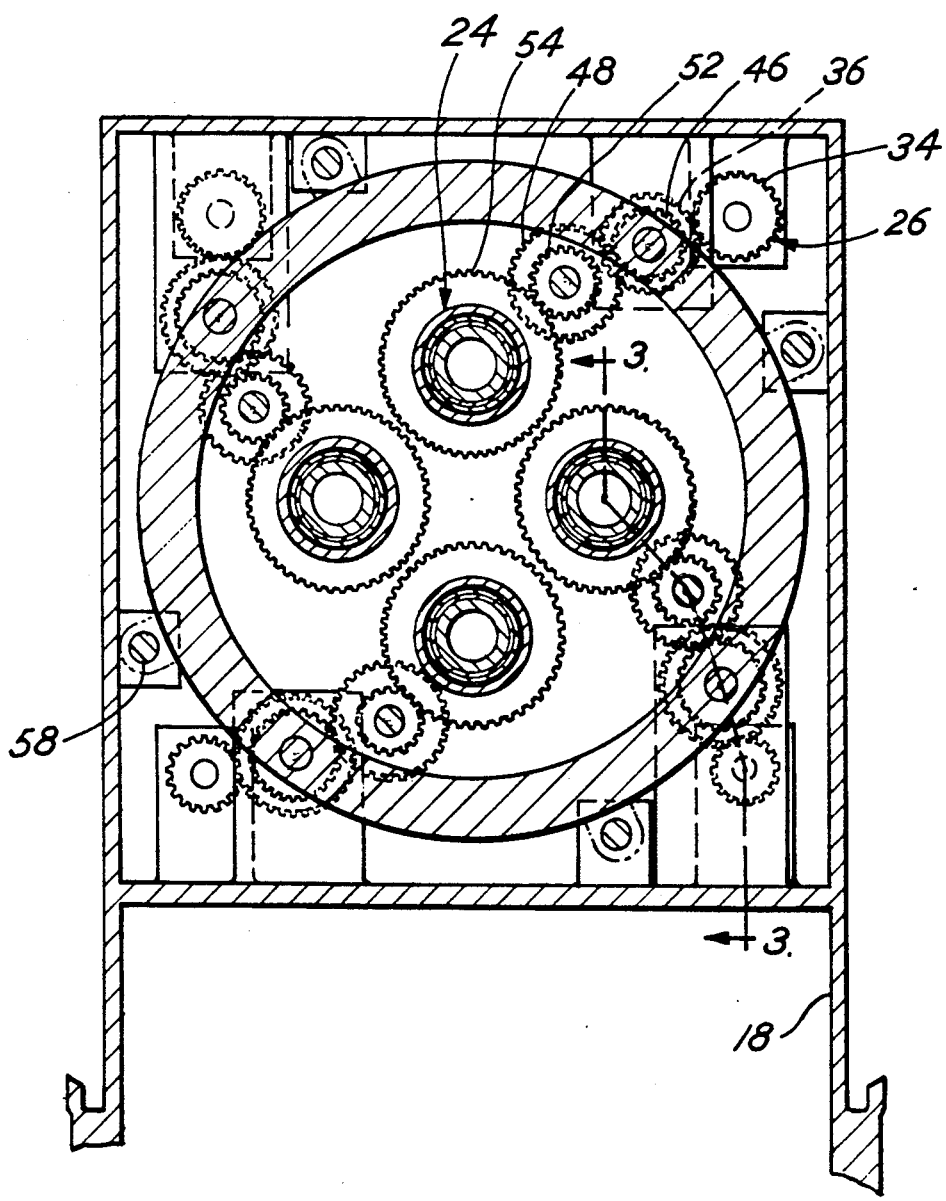
FIG. 2 is a fragmented sectional view taken along line 2—2 of FIG. 1.

The orientation of the spindle drive system gears is illustrated in elevation in FIG. 2. FIG. 2 also illustrates a separate drive system 26 for each individual spindle 24 so that each spindle can be rotated at a speed appropriate with the machining operation being performed at that station.

Figure 7:
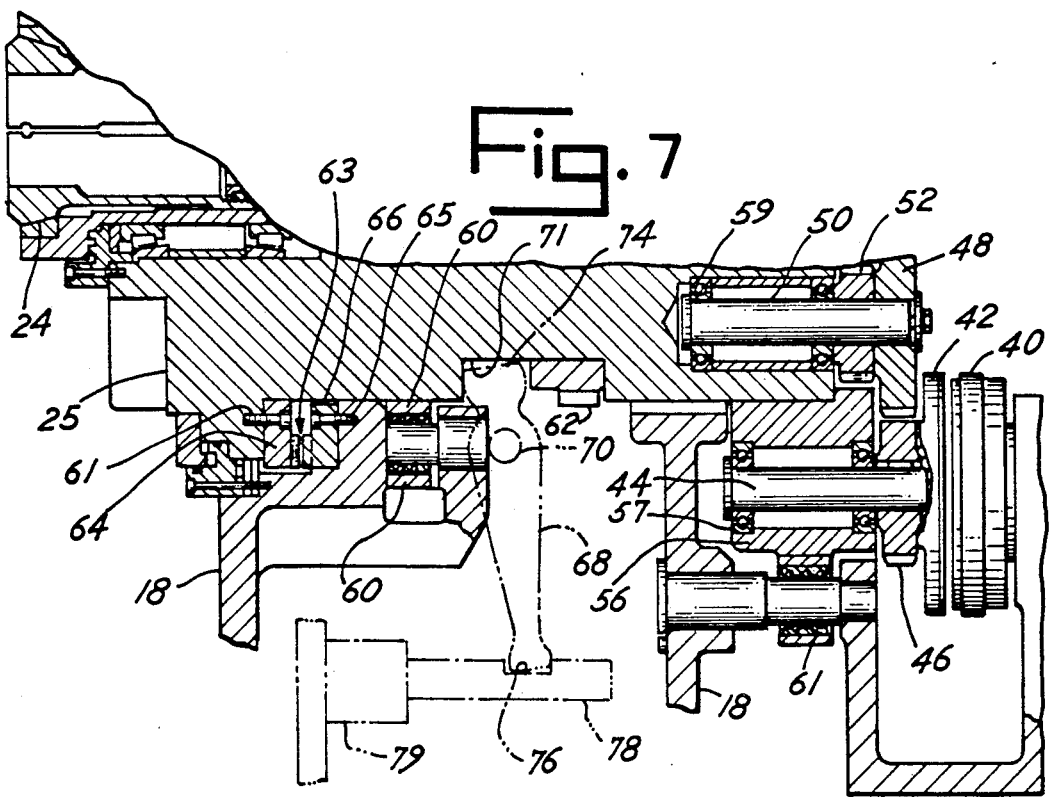
FIG. 7 is a fragmented detailed sectional view like FIG. 6 but showing the drive motor disengaged.

A clutch lever 68 is pivotally supported by a pivot rod 70 which is connected to housing 18. Lever 68 includes trunk portion 72 and head portion 74. As illustrated in FIGS. 6 and 7, head portion 74 is positioned within an annular groove 71 formed in carrier 25 adjacent ring gear 62. Trunk portion 72 of lever 68 is accommodated within a notch 76 of piston rod 78 which reciprocates by way of a conventional hydraulic cylinder 79. Movement of rod 78 causes pivotal movement of lever 68 and the resulting translational movement of carrier 28 between the positions shown in FIGS. 6 and 7.

Figure 5:
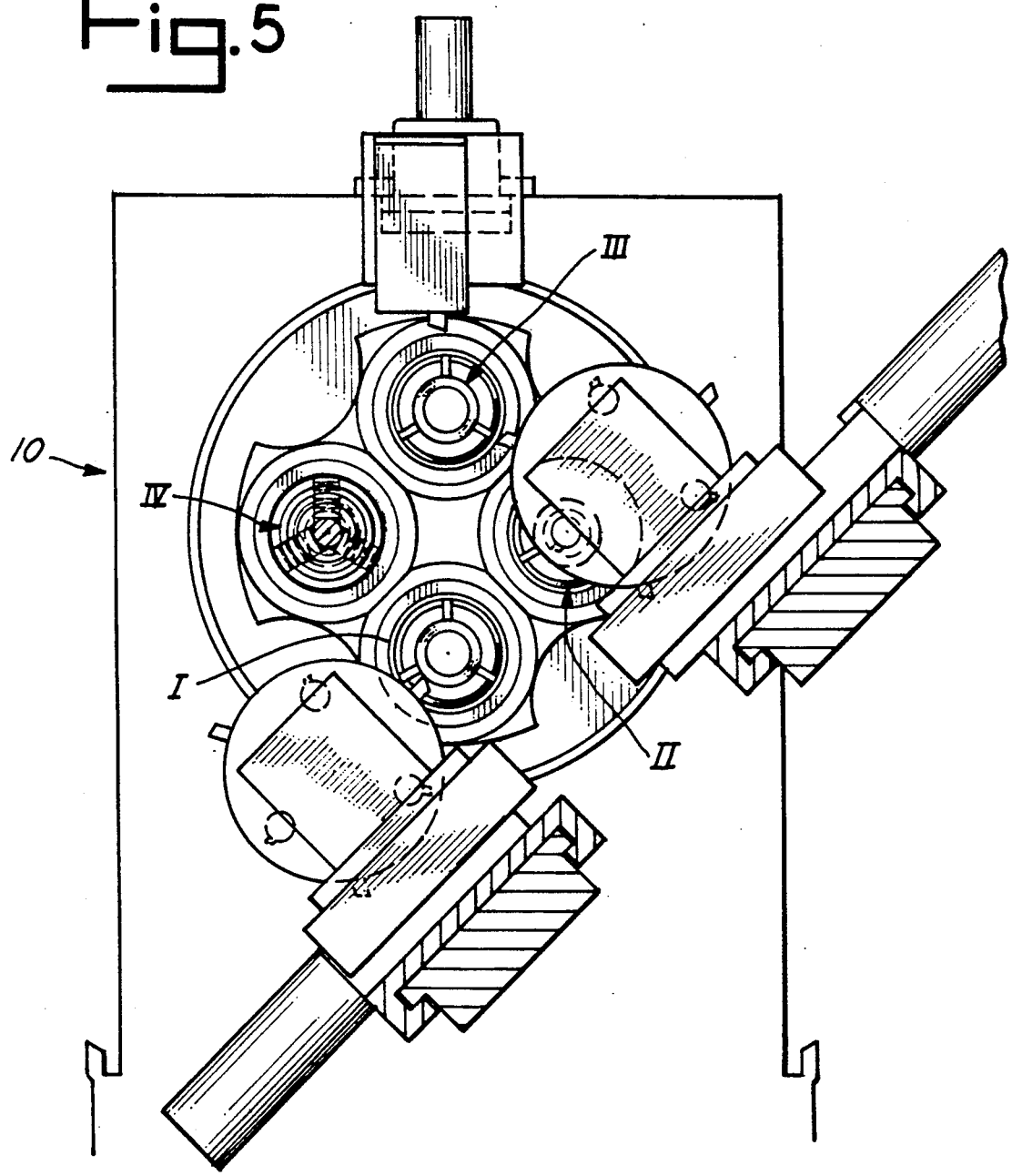
FIG. 5 is a fragmented sectional view taken along line 5—5 of FIG. 1.

FIG. 5 is an end view of the work area 14 showing arrangement of the four work stations. Two slanted 2-axis CNC slides are fitted at stations I and II. A vertical 2-axis cut-off slide is fitted at station III, and a bar feeding device is fitted at station IV. Tool turrets with different cutting tools are shown fixed on the slanted slides ready to perform different machining operations. During the counter-clockwise indexing of the spindle carrier, the bar stock is fed at station IV, carried through stations I and II for different machining operations, and finally cut off as a finished part at station III.

In operation, after bar stock 19 has been loaded into stock reel 13 and chucked in spindles 24 in a manner common in the industry, clutch assembly 38 is activated thereby causing plates 40, 42 to engage. In its operative position of FIG. 6, motors 28 are activated and spindles 24 are rotated. To prevent carrier 25 from rotating during machining of the bar stock the Hirth coupling formed by gears 64 and 66 is in the position of FIG. 6 with gears 64, 66 meshing and engaged.

When it is desired to index the carrier to position the bar stock at the next progressive work station, clutch assembly 38 is deactivated to separate plates 40, 42 a small amount and piston rod 78 is extended outward upon activation of cylinder 79. This causes lever 68 to pivot to slide carrier 25 into its inoperative position as seen in FIG. 7 so as to disengage Hirth coupling 63 and separate gears 64 and 66. As Hirth coupling 63 is disengaged clutch plates 40 and 42 of each drive system 28 are further separated. With gears 64, 66 and clutch plates 40, 42 so separated, indexing of the carrier is accomplished by a conventional gear drive (not shown) which engages ring gear 62 to index carrier 25 and progressively position the bar carrying spindles. After spindles 24 of carrier 25 have been indexed to the next successive work station, piston rod 78 of hydraulic cylinder 79 is retracted, thereby causing gears 64 and 66 to again mesh and clutch plates 40 and 42 to be spaced a small amount. Clutch assembly 38 is reactivated and plates 40, 42 reengage to again apply rotative motion to spindles 24 in the manner previously described.

It should be understood that although a four spindle machine is disclosed, the invention is equally applicable to a machine having any number of spindles and work stations. It should be further understood that the invention is not to be limited to the precise form disclosed but can be modified within the scope of the appended claims.

We claim:

1. A multiple spindle bar machine comprising a plurality of spindles supported by a rotatable carrier, said carrier being supported by a frame and indexable to position each of said spindles at successive work stations, each spindle constituting means for carrying and securing a piece of bar stock to be machined, a plurality of independent rotative drive means each for rotating a spindle, one of said drive means being operatively associated with each of said spindles, each drive means including a motor supported by said frame for independently rotating its associated spindle, each of said motors being at a fixed location relative to said frame, each drive means including a power transmitting means for transferring rotative motion from its associated motor to the motor's associated spindle, said power transmitting means being shiftable into a disassociated position to disrupt rotative motion to said spindle, said power transmitting means being a clutch having first and second clutch parts wherein said first clutch part is rotatably connected to said motor and said second clutch part is rotatably connected to said carrier, said clutch separating said first and second clutch parts upon being deactivated, said locking means operatively associated with said rotatable carrier for preventing rotative movement of said carrier during turning of said bar stock, said locking means including engagement members, one of said engagement members being connected to said carrier and the other of said engagement members connected to said frame, said engagement members being separated and said first and second clutch parts being further separated upon said carrier being shifted away from said motors to allow indexing of the carrier.

* * * * *